US005263649A

United States Patent [19]

Babitzka et al.

[11] Patent Number: 5,263,649

[45] Date of Patent: Nov. 23, 1993

[54] ELECTROMAGETICALLY ACTUATED FUEL ATOMISING AND METERING VALVE OF VERY SMALL DIMENSIONS

[75] Inventors: Rudolf Babitzka, Savigno; Marcello Cristiani, Imola, both of Italy

[73] Assignee: Weber S.R.L., Turin, Italy

[21] Appl. No.: 959,715

[22] Filed: Oct. 13, 1992

[30] Foreign Application Priority Data

Oct. 11, 1991 [IT] Italy .......................... T091A 000772

[51] Int. Cl.[5] .......................... F16K 31/06; B05B 1/32

[52] U.S. Cl. .............................. 239/585.4; 239/585.1; 251/129.15

[58] Field of Search ............... 239/585.1, 585.2, 585.3, 239/585.4, 585.5; 251/129.15

[56] References Cited

U.S. PATENT DOCUMENTS

| | | | |
|---|---|---|---|
| 4,339,082 | 7/1982 | Radaelli et al. | 239/585.4 |
| 4,575,009 | 3/1986 | Giraudi | 239/585.4 |
| 4,711,400 | 12/1987 | Radaelli et al. | 239/585.4 |
| 4,986,478 | 1/1991 | Bertini | 239/585.4 |
| 5,100,102 | 3/1992 | Schecter | 239/585.4 |

FOREIGN PATENT DOCUMENTS

| | | | |
|---|---|---|---|
| 0200865 | 11/1986 | European Pat. Off. | |
| 3105652 | 9/1982 | Fed. Rep. of Germany | |
| 4023828 | 1/1992 | Fed. Rep. of Germany | |
| 91/11605 | 8/1991 | PCT Int'l Appl. | |
| 91/19090 | 12/1991 | PCT Int'l Appl. | |
| 2148388 | 5/1985 | United Kingdom | 239/585.4 |

*Primary Examiner*—Andres Kashnikow

*Assistant Examiner*—Lesley D. Morris

*Attorney, Agent, or Firm*—Baker & Daniels

[57] ABSTRACT

The valve substantially comprises a ferromagnet element provided with a flat bottom wall in which is formed an injection orifice, a first annular wall, adapted to house a movable shutter member and at least partially house an armature fixed to the member itself, and a second annular wall coaxial with the first and adapted to house the lower end of a core and a sealing ring interposed between the wall and the core; the valve further includes a tubular casing of sheet metal adapted to contain an electromagnet and the core, and the lower end of the casing overlying at least a part of the wall of the ferromagnet element and being fixed to this by laser welding.

12 Claims, 3 Drawing Sheets

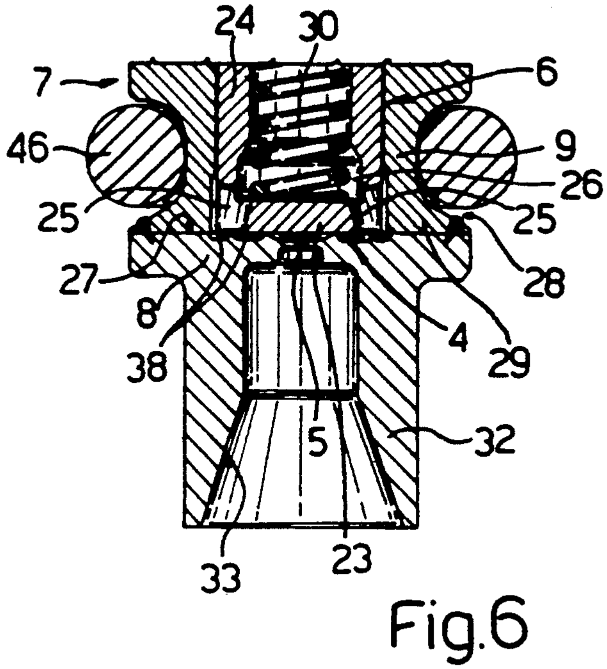
Fig.6
Fig.7
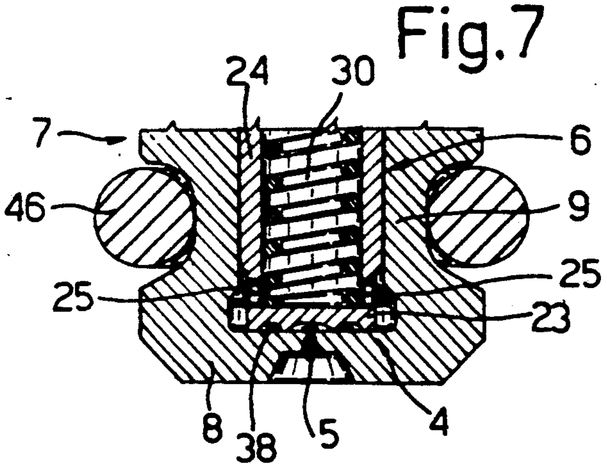
Fig.8
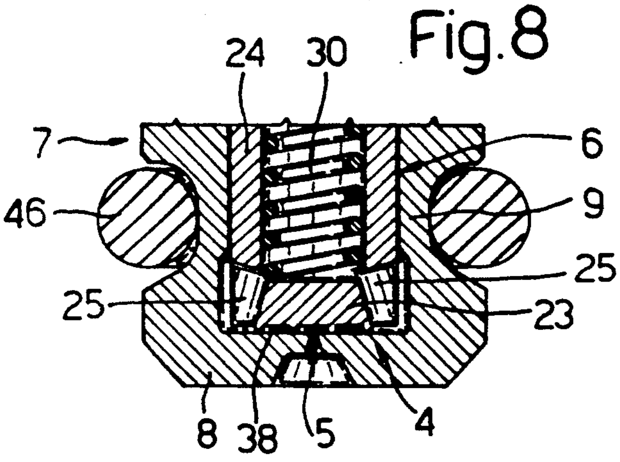

ELECTROMAGETICALLY ACTUATED FUEL ATOMISING AND METERING VALVE OF VERY SMALL DIMENSIONS

BACKGROUND OF THE INVENTION

The present invention relates to an electromagnetically actuated fuel atomising and metering valve for a fuel supply device of a motor vehicle internal combustion engine.

This type of valve comprises a body within which are housed an annular electromagnet, a tubular core disposed within the electromagnet and a shutter member movable between a closure position in which it closes at least once fuel injection orifice and an open position in which the passage through this orifice is left open. The shutter member is fixed to a tubular armature which can be attracted by the core when the electromagnet is excited.

Known valves of the type briefly described have been of a rather large size and are constructionally rather complex, and therefore expensive, both because of the shape of the various parts and members of which they are made and because of the manner in which these parts are connected together.

SUMMARY OF THE INVENTION

The object of the present invention is that of providing an electromagnetically actuated fuel atomising and metering valve with which these disadvantages can be eliminated and therefore which will be of very small size and very simple structure so as to be produced at low cost.

These objects are achieved by means of an electromagnetically actuated fuel atomising and metering valve for a fuel supply device of an internal combustion engine comprising substantially a body within which are housed an annular electromagnet, a tubular core disposed within the electromagnet, and a shutter member movable from a closure position in which it closes at least one injection orifice to an open position in which it leaves the passage through this orifice open, said shutter member being fixed to a tubular armature which can be attracted by said core, characterized in that said body includes:

- a ferromagnetic element provided with a flat bottom wall in which said injection orifice is formed, a first annular wall adapted to house said shutter member and at least partially house said armature, and a second annular wall coaxial with the first and adapted to house the lower end of said core and a sealing ring interposed between said second annual wall and said core;
- a tubular sheet metal casing adapted to contain said electromagnet and said core and made by folding a sheet metal blank having a substantially rectangular form; and
- the lower end of said casing overlying at least a part of said second annular wall of said ferromagnetic element and being fixed to this by means of a first laser welding.

BRIEF DESCRIPTION OF THE DRAWINGS

For a better understanding of the structure and manner of operation of the valve of the invention a description of a particular embodiment will now be given, by way of example with reference to the attached drawings, in which.

DETAILED DESCRIPTION OF THE INVENTION

Figure 1:
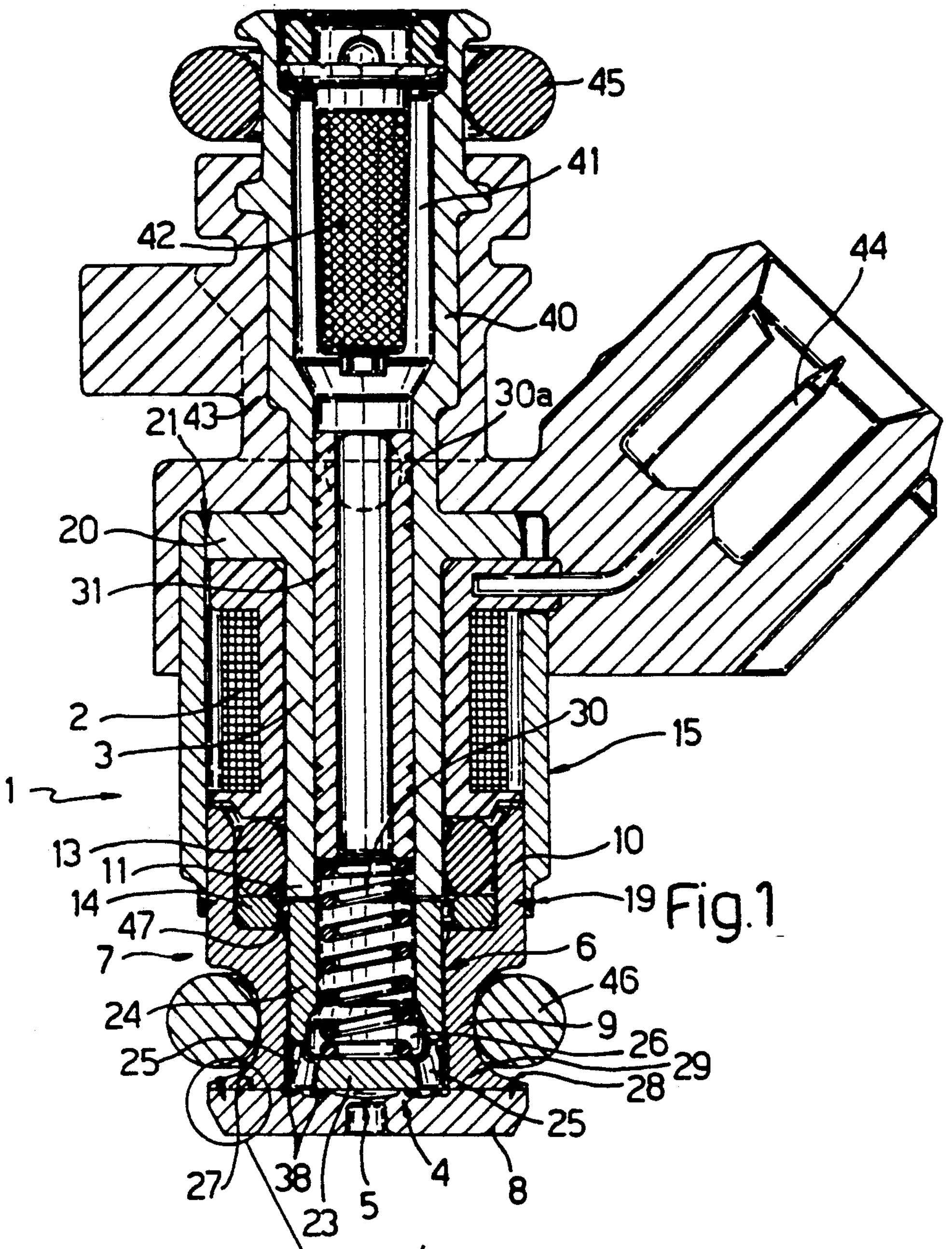
FIG. 1 is an axial section of the valve of the invention.

The valve of the invention substantially comprises a body generally indicated 1 within which are housed an annular electromagnet 2, a tubular core 3 disposed within the electromagnet, and a shutter member 4 which is movable from a closure position, shown in FIG. 1, in which it closes at least one fuel injection orifice 5, to an open position in which it leaves the passage through this orifice open. The shutter member is fixed to an armature 6, also of tubular form, which can be attracted by the core 3.

According to the invention the body 1 substantially comprises ferromagnet element 7 which is provided with a substantially flat bottom wall 8 which may be in the form of a disk, in which the injection orifice 5 is formed, an annular first wall 9 adapted to house the shutter member 4 and at least partially receive the armature 6 and a second annular wall 10 coaxial with the first and adapted to house the lower end 11 of the core 3. The annular wall 10 is also adapted to house a sealing ring 13 which is interposed between the core 3 and the inner surface of the wall itself, as well as a spacer washer 14.

Figure 3:
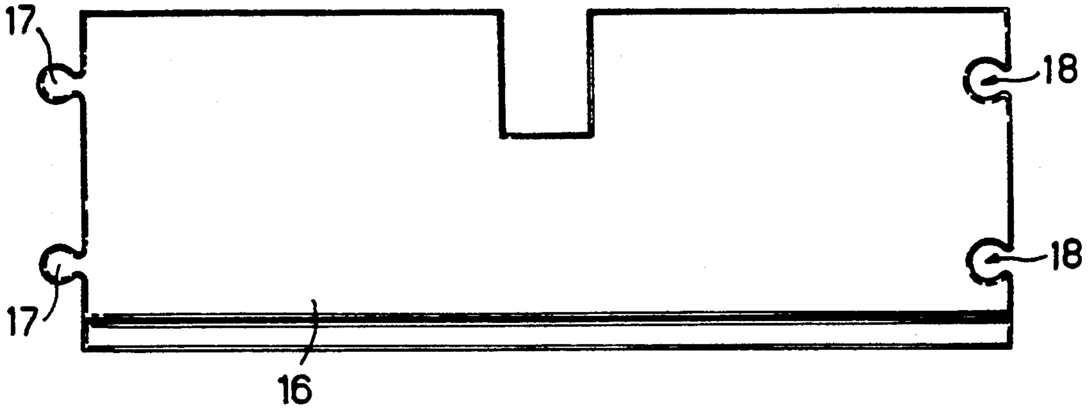
FIG. 3 is a side view of a blank from which the casing of the valve is made; and FIGS. from 4 to 8 show axial sections of the lower part of the valve formed according to different embodiments thereof.

The body 1 further includes a tubular casing 15 made of sheet metal and adapted to contain the electromagnet 2 and the core 3; this casing is made from a sheet metal blank having a substantially rectangular form as is shown in FIG. 3; this blank is conveniently provided with a pair of projections 17 which can be fitted into corresponding recesses 18, after folding of the blank.

As is clearly seen in FIG. 1, the lower end of the casing 15 overlies at least part of the side wall 10 of the ferromagnet element 7 and is fixed to this by laser welding 19.

The core 3 has a flange 20 which is fitted into the upper end of the casing 15 and is fixed to this by means of a further laser welding, indicated 21. The shutter member 4 and the armature 6 as is clearly seen from FIG. 1 are integrally formed from a cup shape body which is provided with a flat bottom wall 23 and a tubular side wall 24; in the cup shape body thus obtained there is formed at least one hole 25 for the fuel. Conveniently these holes are disposed in the annular intersection region between the flat bottom wall 23 and the tubular side wall 24 and the axis of each is slightly inclined with respect to the axis of the armature; said holes open into an annular groove 26 formed within the armature.

In the embodiment shown in FIG. 7 the holes 25 are formed in the tubular side wall 24 and the axis of each of these is substantially radial.

Figure 2:
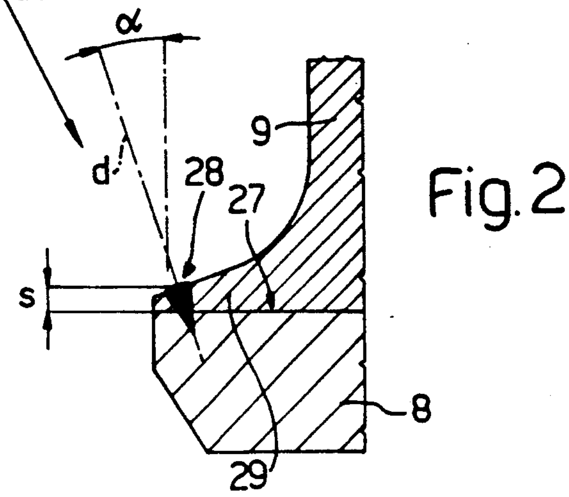
FIG. 2 is an enlarged detail of FIG. 1.

In the embodiment of FIG. 1 the flat bottom wall 8 of the ferromagnet element 7 is formed by a disk (indicated with the same reference numeral), the upper surface 27 of which is coupled to a corresponding flat end surface of the annular first wall 9 of the ferromagnet element 7; this disc is fixed to the annular first wall 9 by means of a third laser welding, indicated 28 which is therefore located in the plane of contact between the lower surface of the flat bottom wall 23 and the upper surface of the disk itself. Conveniently the flat bottom wall 9 of the ferromagnet element 7 has an annular projection 29 (FIG. 2) which overlies the upper surface 27 of the disk 8 and the thickness of which decreases in the direction of the radius of the disk itself as is clearly seen in FIG. 2; the welding 28 is formed between the annular projection 29 and the disk. Moreover it has been found that in order to obtain a welding 28 with good characteristics, the minimum thickness (indicated 's' in FIG. 2) of the annular projection 29 must lie between 0.2 and 0.4 mm. Furthermore the axis of the tool used to form the welding 28 conveniently forms an angle $\alpha=20$ with the axis of the valve; the line representing this axis has been indicated 'd' in FIG. 1.

The valve further includes a coil spring 30 which is fitted in the interior of the armature 6 and is adapted to contact on the flat bottom wall 23 of the shutter member; furthermore a tube 31 is mounted, by plastic deformation of the zone 30*a*, within the interior of the core 3 and is operable to apply a preload to the spring to hold the shutter member against the disk 8.

The disk 8 can be shaped differently from that shown in FIG. 1 may include for example, an annular projection 32 (FIG. 6), which projects from the lower surface of the disc itself. This projection is delimited by an internal conical surface 33 against which fuel exiting from the injection orifice 5 can be directed for the purpose of improving the atomization thereof.

Figure 4:
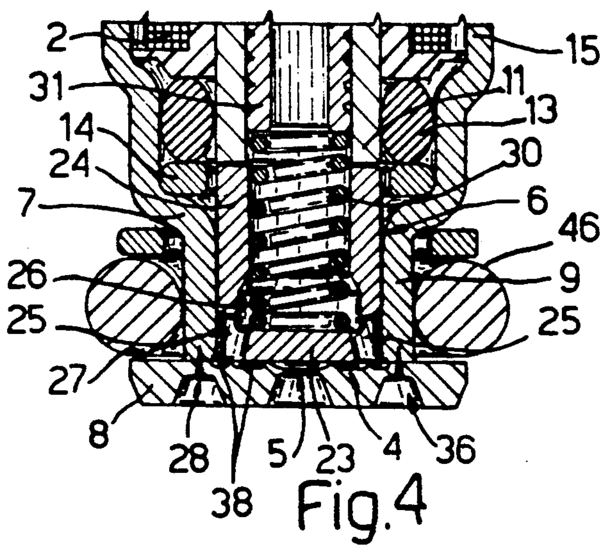

The welding 28 which fixes this disk to the ferromagnet element 7 can be formed within an annular groove 36 (FIG. 4) on the lower surface of the disk itself, whilst the ferromagnet element 7 is not provided with the annular projection 29 and is formed integrally of pressed sheet metal with the casing 15.

Figure 5:
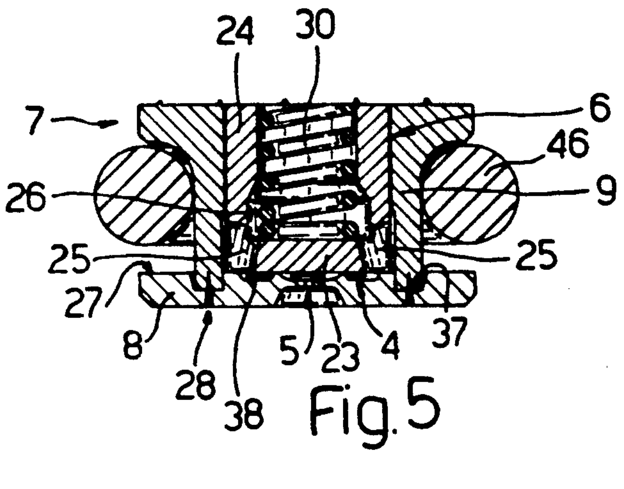

In the embodiment of FIG. 5 an annular groove 37 formed on the upper surface of the disk 8 receives the terminal edge of the ferromagnet element 7.

Finally, as in the embodiment of FIGS. 7 and 8, the ferromagnet element 7 and the disk 8 may be formed integrally.

In the embodiment of FIGS. 1, 4, 5, and 6 there are formed 2 coaxial annular grooves 38, concentric with the axis of the valve on the upper surface 27 of the disc 8; these give rise to two corresponding projections on which the shutter member 4 engages. In the embodiment of FIGS. 7 and 8 the annular grooves, and therefore the corresponding projections, are on the other hand formed on the flat bottom wall 23 of the shutter member 4.

Upwardly from the flange 20 projects a sleeve 40 (FIG. 1) within the interior of which is formed a fuel duct 41 within which is disposed a filter 42. Over this sleeve, the flange 20 and the casing 15 is disposed a cap 43 in which are fitted electrical connection elements 44 connected to the conductors of the electromagnet 2.

Finally, a pair of sealing rings 45 and 46 is provided to form a seal respectively between the valve and the fuel duct (not shown), which supplies the fuel thereto, and between the valve and the seat in which this is mounted.

The operation of the valve is as follows: Fuel is supplied to the interior of the duct 41 and through the tube 31 reaches the interior of the armature 6; from here the fuel flows towards the injection orifice 5 through the holes 25 in the shutter member 4 as soon as the electromagnet 2 is excited; in this way the armature 6 is attracted by the core 3 overcoming the resistance of the coil spring 30.

The fuel which enters into the valve cannot flow towards the electromagnet 2 and therefore to the interior of the casing 15, due to the presence of the sealing ring 13 which applies pressure both to the outer surface of the core 3 and the inner surface of the wall 10 of the ferromagnet element 7.

The dimensions of the valve of the invention are very small; in fact the electromagnet 2 is contained within the casing 15 which, being made of sheet metal is very thin. Moreover the magnetic circuit is formed within the core 3, the armature 6 and the wall 10 of the ferro magnet element 7 which, because of its structure and the manner of connection to the casing 15, has extremely small dimensions (in particular the outer diameter).

The seal formed with the valve is very good since the upper surface 27 of the disk 8 and the lower surface of the annual first wall 9 against which the first surface engages can be ground in a very precise manner before the welding 28 is effected; consequently, therefore, the surface 27 of the said disk is perfectly perpendicular to the axis of the ferromagnet element 7 and therefore to the shutter member 4.

The structure of the valve of the invention is very simple and it can be made at low cost; in fact, above all, the casing 15 can be made from a metal blank such as that shown in FIG. 3 by means of simple cutting and folding operations; similarly the ferromagnet element 7, the core 3 and the armature 6 (which constitutes a single piece with the shutter member 5) can be made in a simple and rapid manner by means of automatic machines. Finally, the connection between the disk 8 and the ferromagnet element 7, between this and the casing 15, and between this latter and the flange 20 of the core 3 are formed by means of three simple welds (28, 19, and 21) which can also be performed on automatic machines.

The embodiments of the present invention described herein can have modifications and variations introduced thereto without departing from the invention itself.

We claim:

1. An electromagnetically actuated fuel atomizing and metering valve for a fuel supply device of an internal combustion engine comprising a body (1) within which is housed an annular electromagnet (2), a tubular core (3) disposed within the electromagnet and a shutter member (4) movable from a closure position in which it closes at least fuel injection orifice (5) to an open position in which it leaves at least one fuel injection orifice open, said shutter member (4) being fixed to a tubular armature (6) which can be attracted by said core (3), wherein said body (1) includes: a ferromagnet element (7) provided with a flat bottom wall (8) in which said injection orifice is formed, a first annular wall (9) adapted to house said shutter member (4) and at least partially house said armature (6), and a second annular wall (10) coaxial with the first and adapted to house the lower end (11) of said core (3) and a sealing ring (13) interposed between said second annular wall (10) and said core; a tubular casing (15) of sheet metal adapted to contain said electromagnet (2) and said core (3) and made by folding a sheet metal blank (16) having a substantially rectangular form; and the lower end of said casing (15) overlying at least a part of the second annular wall (10) of said ferromagnet element (7) and being fixed to this by a first laser welding (19).

2. A valve according to claim 1, wherein said core (3) has a flange (20) which is fitted into the upper end of said casing (15) and fixed to said casing by a second laser welding (21).

3. A valve according to claim 1, wherein said actuator member (5) and said armature (6) are formed integrally in the form of a cup which is provided with a flat bottom wall (23) and a tubular side wall (24) and wherein at least one hole (25) for the fuel passes through one of said cup walls.

4. A valve according to claim 3, wherein said at least one hole is formed in an annular intersection between said cup flat bottom wall (23) and said cup tubular side wall (24), and said at least one hole having a central axis slightly inclined with respect to the armature (6) central axis.

5. A valve according to claim 3, which includes a coil spring (30) fitted in said armature (6) and operable to engage on said flat bottom wall (23) of said cup, within said core (3) there being mounted, by plastic deformation, a tube (31) operable to apply a pre-load to said spring.

6. A valve according to claim 1, wherein said at least one hole (25) is formed in said cup tubular side wall (24) and the axis of said at least one hole is radial.

7. A valve according to claim 1, wherein said flat bottom wall (8) of said ferromagnet element is formed by a circular disk having a flat upper surface (27) coupled to a corresponding flat surface of said first annular wall (9) of the ferromagnet element, said disk being fixed to said first annular wall (9) by a third laser welding (28).

8. A valve according to claim 7, wherein said first annular wall (9) of the ferromagnet element (7) has a annular projection (29) which overlies said upper surface (27) of said disk and has a thickness which decreases in the radial direction of the disk, said third laser welding (28) is effected between said annular projection of said first annular wall and said disk.

9. A valve according to claim 8, wherein said annular projection has a minimum thickness that lies between 0.2 and 0.4 mm.

10. A valve according to claim 7, wherein said disk has a tubular projection (32) projecting from the lower surface of the disk itself.

11. A valve according to claim 1, wherein said third laser welding (28) is located substantially in the same plane as that in which the lower surface of said flat bottom wall (23) of the shutter member (4) engages on the upper surface of said disk.

12. A valve according to claim 1, wherein said ferromagnet element (7) and said casing (15) are made integrally of pressed sheet metal.

* * * * *